April 4, 1967 D. N. JUDELSON 3,312,133
SHEET MATERIAL CUTTING MACHINE
Filed Nov. 3, 1964 7 Sheets-Sheet 1

FIG. 1.

INVENTOR.
DAVID N. JUDELSON
BY
Amster + Rothstein
ATTORNEYS

D. N. JUDELSON 3,312,133

SHEET MATERIAL CUTTING MACHINE

Filed Nov. 3, 1964

INVENTOR.
DAVID N. JUDELSON
BY
Amster + Rothstein
ATTORNEYS

April 4, 1967  D. N. JUDELSON  3,312,133
SHEET MATERIAL CUTTING MACHINE

Filed Nov. 3, 1964  7 Sheets-Sheet 6

INVENTOR.
DAVID N. JUDELSON
BY
Amster & Rothstein
ATTORNEYS

FIG. 10.

INVENTOR.
DAVID N. JUDELSON
BY
Amster & Rothstein
ATTORNEYS

United States Patent Office 3,312,133
Patented Apr. 4, 1967

3,312,133
SHEET MATERIAL CUTTING MACHINE
David N. Judelson, New York, N.Y., assignor to Oscar I. Judelson, Inc., Jersey City, N.J., a corporation of New York
Filed Nov. 3, 1964, Ser. No. 408,579
11 Claims. (Cl. 83—83)

The present invention relates generally to sheet material cutting machines and particularly to a machine for severing a continuous web of textile material into generally rectangular sheets of predetermined width and length, the rectangular sheets having rounded corners.

In many industries, such as the mattress industry, it is required to cut textile materials from a continuous roll into predetermined rectangular sizes and it is further necessary to form rounded corners on the rectangular pieces. In today's mass production manufacturing techniques, where literally thousands of identical products are manufactured at one time, there exists the need for a cutting machine which can quickly, reliably, efficiently and economically perform these cutting operations. Since in any given manufacturing situation, rectangular sheets of a number of different sizes must be cut, it is a requirement of such a machine that variations as to the length and the width of the rectangular sheets may be easily accomplished by appropriate adjustment means. Furthermore, it is desirable that such a machine be provided with means whereby the finished products are uniformly arranged with one sheet stacked above the other. It is still further advantageous in such a machine to provide mechanisms wherein the portion of the sheet material which is trimmed therefrom is rolled up in a form which makes that material usable in a subsequent operation to form the side panels of a mattress construction. These and other features are provided in accordance with the present invention.

Accordingly, it is an object of the present invention to provide a machine for cutting a continuous web of sheet material into rectangular sheets having rounded corners. More specifically, it is an object of the present invention to provide such a machine which accomplishes its intended function quickly, efficiently, with relatively low labor costs and with a high degree of product reliability.

It is further within the contemplation of the present invention to provide such a sheet material severing machine which can perform its operation on a continuous and automatic basis.

It is further within the contemplation of the present invention to provide such a sheet material severing machine which is readily adaptable for cutting rounded corner rectangular sheets of a variety of different sizes.

It is also within the contemplation of the present invention to provide a sheet material severing machine which effectively cuts sheet material into rounded corner rectangular sheets and arranges the cut sheets in a uniform manner with one sheet piled above the next.

In accordance with one illustrative embodiment of the present invention, there is provided a machine for cutting from a continuous roll of sheet material, rectangular sheets having rounded corners. The machine includes a frame having means to mount a roll of sheet material and guide means and advancement means for moving the sheet material along a material flow path. A pair of side cutting knives are mounted at spaced locations at a first cutting station and are adjustably movable with respect to each other to cut the sheet material to a predetermined width. At a second cutting station a pair of corner cutters are provided for movement into and out of the flow path to cut rounded corners into the sheet material at predetermined points along the side edges. The corner cutters are movable with respect to each other and, with the side cutting knives, for cutting the corners at the predetermined width of the end product. End cutting means are mounted at a third station for transversely cutting the sheet material to form the individual rectangular sheets. The end cutting means include a pair of cooperating shear blades mounted transversely of, and on opposite sides of, the flow path and arranged such that the sheet material normally passes between the respective blades. Sheet receiving and stacking means are also provided on the frame and include a movable arm with means mounting the arm for movement in timed relation to and below the end cutting means and adapted to catch the rectangular sheets as they are cut from the sheet material. Drive means are provided in the machine and are operatively connected to the sheet material advancement means, the side cutting knives, the corner cutters, the end cutting means and the receiving and stacking means. Furthermore, coordination and control means are provided on the machine for advancing the sheet material and moving the corner cutters into the flow path, halting the advancement of the sheet material, activating the end cutting means and moving the receiving arm beneath the end cutting means in a timed and coordinated relationship.

The above brief description, as well as further objects, features and advantages of the present invention, will be best appreciated by reference to the following detailed description of one illustrative embodiment of the invention when taken in conjunction with the accompanying drawings, wherein.

Figure 8:
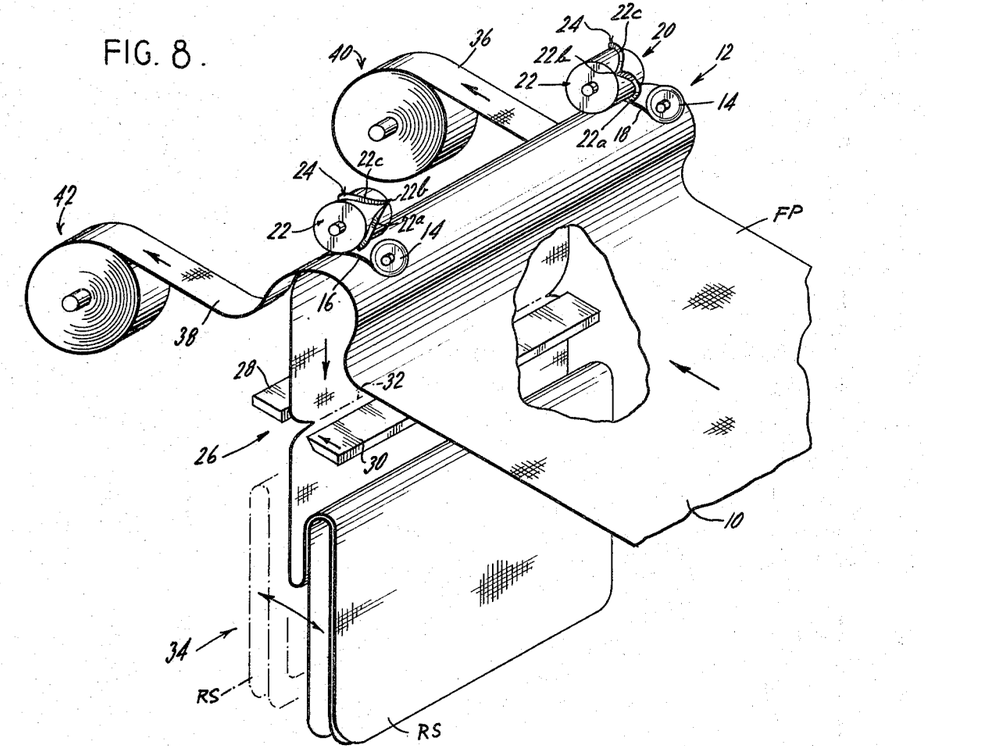
FIG. 8 is a schematic and perspective view of the cutting operation which is performed by the machine according to the present invention.

Before making specific reference to the construction of the presently preferred machine according to the invention, reference is made to FIG. 8 for a general description of the cutting process performed by the machine. As seen in FIG. 8, a web of sheet material 10 is moved axially along its length and is guided and transported by appropriate rollers (not shown in FIG. 8) which carry the material 10 around a curved work flow path FP. At a first cutting station, designated by the numeral 12, there are mounted a pair of rotary side cutting knives 14 adapted to trim the sheet material 10 into the appropriate width for the finished product. The finished rounded corner rectangular sheets formed by the machine are generally designated by the symbol RS. As may be seen in FIG. 8, the side cutting rollers make side edge cuts 16, 18 along the length of the sheet material 10; the distance between cut 16 and 18 constitutes the width of the finished rectangular sheet. As will be described below, the side cutting rollers 14 are mounted for movement with respect to each other such that the width of the finished product may be varied at will. At a second cutting station, generally designated by the numeral 20, there are mounted a pair of rotary corner cutters 22 which are provided with wing-shaped or butterfly-shaped cutting knives 24. The cutting knives 24 of the corner cutters 22 are effective to form a double curved corner cut in the material 10 when the corner cutters 22 are moved into the flow path FP and rotated such that the peripheral speed of the corner cutters 22 is equal to the linear speed of the sheet material 10. As may be seen easily in FIG. 8, the cutting blades 24 have a first curved portion 24a in one direction, terminating in a point 24b, and a second curved cutting portion 24c continuing from the central point 24b and curved in the opposite direction. The first portion 24a of the blade will cut a curved corner of one rectangular sheets RS and the second curved portion 24c will similarly cut the adjacent corner on the next successive rectangular sheet RS. After the sheet material 10 passes through the first two cutting stations 12, 20, it passes a third cutting station 26 at which is mounted a pair of shear blades 28, 30. The shear blades 28, 30 are positioned on opposite sides of the flow path FP and, when they are brought together in shearing action, are adapted to form a transverse end cut in the sheet material 10 along a line between the center points of the double curved cuts formed by the knives 24. This line is shown in dotted configuration in FIG. 8 and labeled with the number 32.

With each operation of the shears 28, 30 at the third cutting station 26, an additional rectangular sheet RS is cut from the sheet material 10. When the cutting operations are performed, the rectangular sheets RS fall downwardly and are received at a stacking station generally designated by the numeral 34. The stacking station 34 has a receiving arm (not shown in FIG. 8) which cyclically moves across the flow path FP to catch each cut rectangular sheet RS as it is severed from the sheet material 10. As may be seen from the dotted line illustration and the arrow in FIG. 8, the receiving arm moves back and forth once for each cutting operation at the third cutting station 26 such that the pile of rectangular sheets RS received upon the arm are all oriented in the same manner. The rectangular sheets RS thereafter may be removed from the stacking station 34 and used in the next manufacturing operation.

As seen in FIG. 8, the edge material 36, 38 which is cut by the side cutting knives is conveniently formed into a pair of rolls 40, 42. These materials may be joined with the rectangular sheets RS to form the side faces of the finished mattresses.

The general sequence of operations of these various mechanisms is such that the sheet material 10 is fed at a uniform rate with the side cutter rollers 14 continuously forming the cut lines 16, 18. Periodically, the corner cutters 22 are moved into the flow path FP to cut the butterfly-shaped cut-outs which form the rounded corners of the two adjacent rectangular sheets RS. Shortly after the corner cutters 22 have performed their operation, movement of the sheet material 10 is halted such that the points of the corner cut (the dotted line 32) are exactly aligned with the shear blades 28, 30. The shear blades 28, 30 then are actuated to form the end cut of the rectangular sheet RS. The mechanisms at the stacking station 34 are operated in a timed relationship to the operation of the shear blades 28, 30 such that the receiving arm moves beneath the third cutting station 26 at the appropriate moment to catch the cut rectangular sheet RS and drape same in the desired manner.

Figures 3, 4:
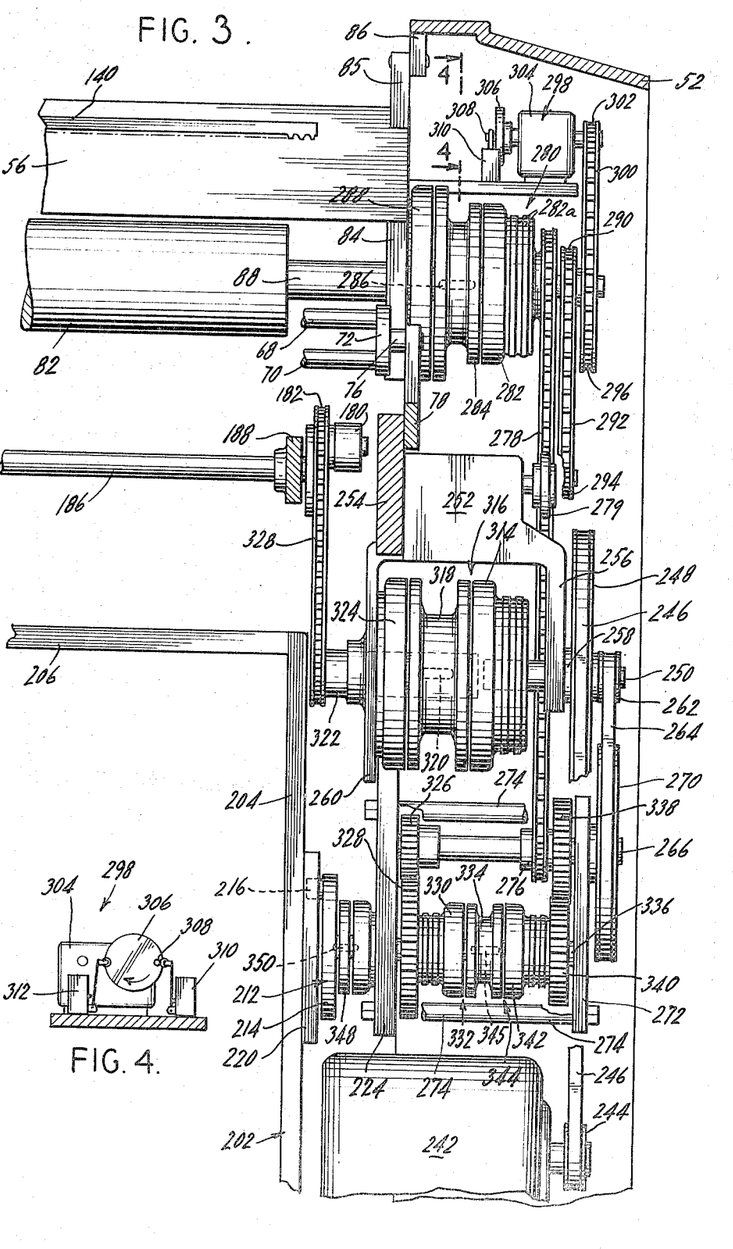
FIG. 3 is a sectional view taken along the line 3—3 of FIG. 1 looking in the direction of the arrows, illustrating a portion of the drive mechanism for the various movable parts of the machine.
FIG. 4 is a sectional view taken along the line 4—4 of FIG. 3, illustrating part of the length measuring mechanisms of the machine.

Referring now to FIGS. 1 through 7, it is seen that the machine includes a main frame, generally designated by the numeral 50, which includes a pair of tapered end frames 52, 54 joined together by appropriate cross braces, such as the cross brace 56 joining the upper end of the end frames 52, 54 (best seen in FIG. 3). Continuous sheet material 10 is unwound from a roll R which is supported upon the frame 50 of the machine by means of a pair of generally triangular supports 58 (see FIG. 1) which have U-shaped cutouts 60 formed along their upper edges adapted to receive a hub 62 which is threaded through the roll R and is adapted to support same. As may be seen in both FIGS. 1 and 5, the material 10 is removed from the roll R and passes upwardly over a combination cross brace and guide member 64 which extends from side to side of the machine. The web of material 10 is then guided through a tension device, generally designated by the numeral 66, which includes a pair of tension bars 68, 70 extending from side to side of the machine and rigidly mounted on a pair of rotatable discs 72 which in turn are supported for rotation within the frame 50. The discs 72 are mounted on shafts 76 which are supported by the front-to-rear cross braces 78, 80 of the frame 50 and may be positioned in any desired rotational orientation in order to vary the tension imparted to the material 10 as it passes through the tension device 66.

After the material 10 leaves the tensioning device 66, it is engaged about an anvil roller 82 which is rotatably mounted between the end frames 52, 54. Specifically, the anvil roller 82 is mounted between the rectangular mounting plates 84 which are secured to the end frames 52, 54, as at the mounting brackets 85, 86, seen best in FIGS. 3 and 7. The anvil roller 82 is mounted upon a shaft 88 which in turn is carried by suitable bearings secured to the rectangular mounting plate 84. The drive means for the rotation of the anvil roller 82 are connected to the shaft 88 as will be described in detail below.

Figure 5:
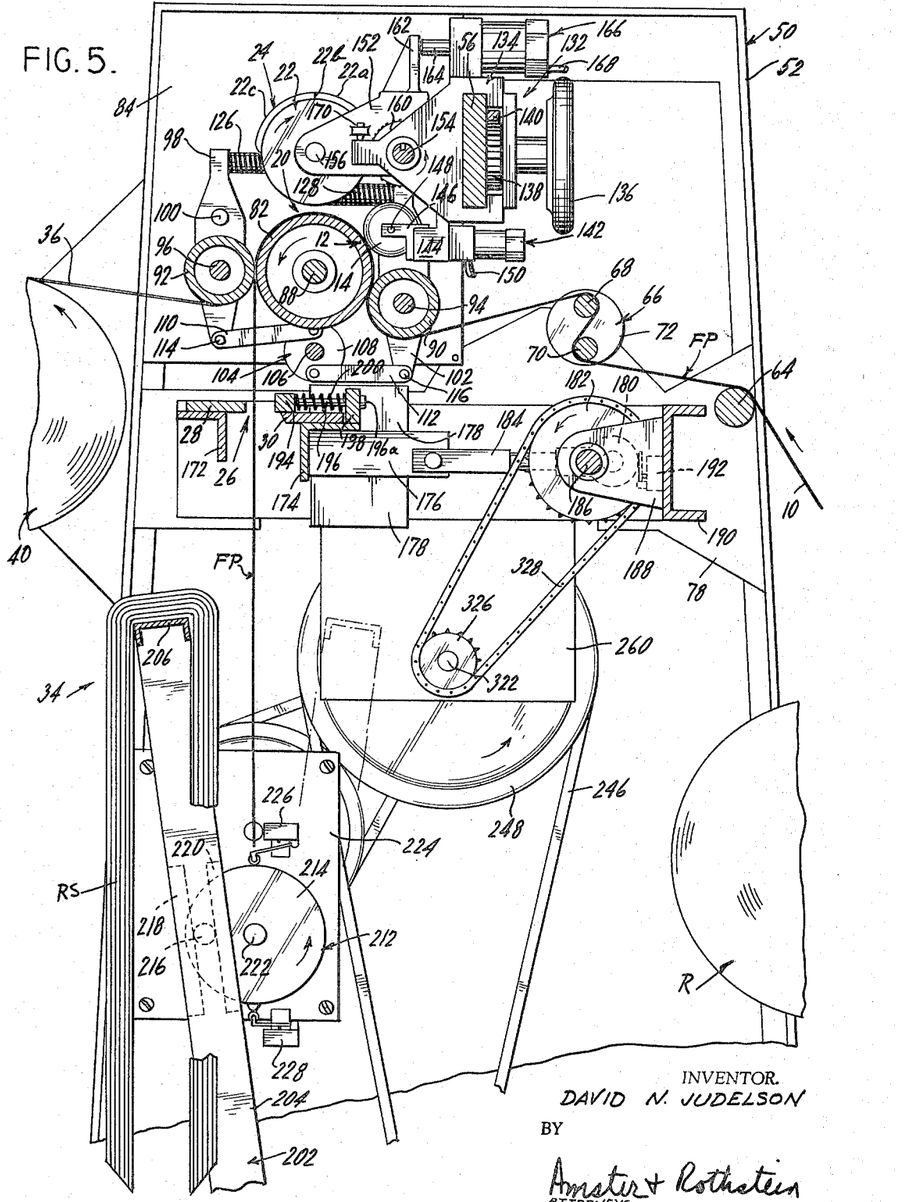
FIG. 5 is a sectional view along the line 5—5 in FIG. 2 and looking in the direction of the arrows.

Associated with and in parallel engagement with the anvil roller 82 are a pair of idler or clamping rollers 90, 92 which are positioned on opposite sides of the anvil roller 82 (see FIG. 5). As may be best seen in FIG. 5, the flow path FP of the sheet material 10 is defined by the rollers 82, 90, 92 with the material 10 flowing below and upwardly around the first idler roller 90, about the upper surface of the anvil roller 82 and downwardly between the anvil roller 82 and the second idler roller 92. The idler rollers 90, 92 are mounted on shafts 94, 96 respectively which, in turn, are mounted within the frame 50 of the machine such that they may be moved into and out of engagement with the anvil roller 86 thereby to allow the threading of the sheet material 10 along the flow path FP. Specifically, the shaft 96 is mounted upon a mounting beam 98 which is pivoted at 100 upon the rectangular mounting plate 84. Similarly, shaft 94 supporting the idler roller 90 is mounted for rotation on a mounting beam 102 which is similarly pivoted to the rectangular plate 84 at a location which is not visible in FIG. 5 but which corresponds to location of the pivot 100 on the mounting beam 98. The mounting beams 98, 102 are pivoted about their mounting points 100 in order to swing the rollers 90, 92 outwardly from the anvil roller 82 in order to facilitate feeding of the sheet material 10 along the flow path FP. This is accomplished by means of a release mechanism generally designated by the numeral 104 which includes a shaft 106 pivotally supported between the rectangular mounting plates 84 and which rigidly mounts a pair of discs 108, one at each end respectively. The discs 108 are pivotally connected to a pair of links 110, 112 at points on opposite sides of the disc 108 which links are pivotally connected at their other ends to the mounting beams 98, 102 at points 114, 116 respectively. It will be appreciated that when the shaft 106 is turned in a counterclockwise direction as seen in FIG. 5, the disc 108 will also turn in a counterclockwise direction, effecting a clockwise rotation of the mounting beam 98 and a counterclockwise rotation of the mounting beam 102 through the action of the connecting links 110, 112. This will swing the idler rollers 90, 92 outwardly from the anvil roller 82, thereby allowing the machine operator to feed a web of sheet material 10 into and between the rollers along the flow path FP.

Figure 6:
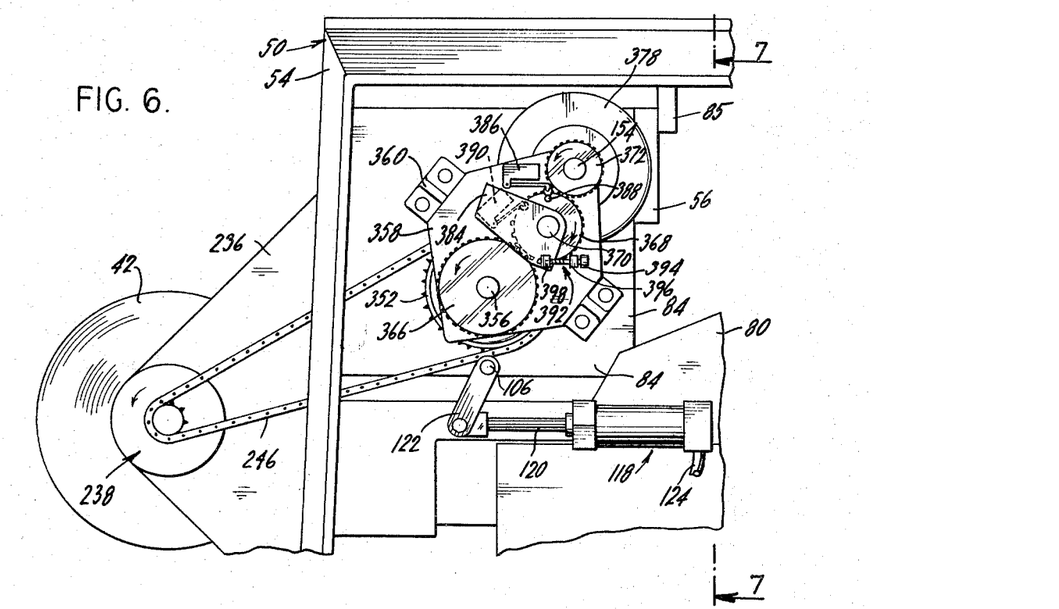
FIG. 6 is a partial side elevational view of a machine, illustrating a portion of the control mechanisms.

The feed release mechanism 104 is actuated by means of a piston and cylinder assembly 118 mounted on the cross beam 80 and best seen in FIG. 6. The piston rod 120 of the piston and cylinder assembly 118 is connected to a crank arm 122 which is, in turn, connected to the shaft 106 at the point where it extends through the left rectangular mounting plate 84. Accordingly, when air is delivered through the tubing 124 to the piston and cylinder assembly 118, the piston rod 120 moves outwardly of the assembly, moving the crank arm 122 and rotating the shaft 106 in the clockwise direction as seen in FIG. 6 (the counterclockwise direction as seen in FIG. 5) thereby to swing the mounting beams 98, 102 and the idler rollers 90, 92 outwardly of the anvil roller 82.

The idler rollers 90, 92 are normally biased inwardly against the anvil roller 82 by operation of the pairs of compression springs 126, 128 which are mounted between the upper ends of the respective mounting beams 98, 102 and the central brackets 130 (see FIG. 2) which are secured to the rectangular plates 84. It will be appreciated that the normal bias force exerted by the springs 126, 128 against the upper ends of the mounting beams 98, 102 causes those beams to rotate inwardly about their pivotal mounts with respect to the anvil roller 82, thereby to bias the rollers 90, 92 into engagement with the anvil roller 82, with the sheet material 10 firmly held therebetween.

The anvil roller 82 defines the position of the first cutting station 12 and the second cutting station 20. Specifically, the first cutting station 12 is at the location of the side cutting rollers 14 adjacent the anvil roller 82 and the second cutting station 20 is defined by the location of the corner cutter 22. Two pairs of corner cutters 22 and side cutting knives 14 are mounted on two carriages 132. Each of the carriages 132 is identical and, accordingly, only one of the same will be specifically described. The carriage 132 includes a carriage frame 134 which is slidably mounted on the main side-to-side beam 56 such that the location of the pairs of respective corner cutting and side cutting knives may be varied with respect to each other to produce finished rectangular sheets of any desired widths. Movement in a side-to-side direction of the carriage frame 134 on the beam 56 is governed by a hand wheel and shaft 136 which is secured to a pinion gear 138 which is cooperatively engaged with a locating rack 140 secured to one of the surfaces of the beam 56 (see FIGS. 3 and 5). It will be appreciated that rotation of the hand wheel 136 will cause the gear 138 to rotate and will cause the carriage frame 134 to move transversely along the beam 56.

The side cutting knives 14 are mounted on the end of a side cutting piston and cylinder assembly 142 which is mounted on a bracket 144 secured to the carriage frame 134. The piston within the assembly 142 is connected at its forward end to a bracket 146 which mounts, at pivot 148, the side cutting wheels 14. Upon introduction of air at the air hose 150, the piston of the piston and cylinder assembly 142, is driven outwardly, moving the side cutting wheels 14 cut of their normal biased engagement with the anvil roller 82, thereby to allow sheet material 10 to be fed into the cutting machine.

The mountings of the two corner cutting wheels 22 are similar and, therefore, only one of the same will be described. The corner cutting wheel 22 is mounted on a supplemental frame 152 which is pivotally mounted on the carriage frame 134 by means of a keyed shaft 154. As may be best seen in the top view of FIG. 2, the keyed shaft 154 extends from side to side of the machine and passes through the arms 134a and 134b of the carriage frame 134. The auxiliary frame 152 is positioned between the arms 134a, 134b and is provided with an appropriate central bearing such that the auxiliary frame 152 is supported within the carriage frame 134 for relative rotation with respect to the shaft 154. In a manner generally similar to the construction of the carriage frame 134, the auxiliary frame 152 is also bifurcated and has a pair of arms 152a and 152b. The corner cutting wheel 22 is mounted on a shaft 156 by means of suitable bearings such that it rotates within the arms 152a, 152b. A pinion gear 158 is rigidly secured to the corner cutting wheel 22 and cooperates with a further pinion gear 160 which is mounted on and keyed to the keyed shaft 154. Accordingly, when the keyed shaft 154 rotates within the carriage frame 134 and the auxiliary frame 152, the gear 160 is caused to rotate which causes the gear 158 and the associated corner cutting wheel 22 to rotate. Referring again to FIG. 5, the auxiliary frame has an upright extension 162 which is engaged with the piston rod 164 of a piston and cylinder assembly 166 mounted upon the carriage frame 134. Air is introduced into the piston and cylinder assembly 166 through the air hose 168 to constantly urge the piston rod 164 toward the left in FIG. 5, thereby to constantly bias the auxiliary frame 152 in the counterclockwise direction such that the corner cutting wheel 22 is constantly biased in a downward direction toward the anvil roller 82. Adjustable stops 170 are formed on each arm 152a, 152b of the auxiliary frame 152 to prevent the piston and cylinder assembly 166 from urging the corner cutter wheel 22 all the way against the anvil 82. The spacing between the corner cutting wheel 22 and the anvil wheel 82 is adjusted so that the edges of the cutting knives 22a, 22c just come into contact with the anvil roller 82. Accordingly, when there is a layer of sheet material 10 on the anvil 82, the bias force of the air and the piston and cylinder asembly 166 will effectively force the cutting knives 22a, 22c through the sheet material 10 to perform the desired cutting operation.

As will be explained in detail below, the keyed shaft 154 is actuated at the proper moment in the course of the cutting operations to rotate the corner cutting wheel 22 and bring the blades 22a, 22c into engagement with the sheet material 10 at the proper moment.

The third cutting station 26 is located immediately below the point at which the anvil roller 82 and the second idler wheel 92 contact each other such that the web of sheet material 10 flows downwardly under the influence of gravity from the anvil roller 82 and between the shear blades 28, 30. The first shear blade 28 is secured transversely of the machine and is mounted on an angle bar 172 which extends transversely of the machine and is secured at its ends to the cross braces 78, 80, thus rigidly mounting the first shear blade 28 to the frame 50 of the machine. The movable or second shear blade 30 is mounted on an angle bar 174 which, in turn, is secured at its ends to a pair of slide bars 176 which are received within ways formed by the mounting blocks 178 secured to the frame 50. The slide bars 176 are each attached to an eccentric 180 on a sprocket 182 by means of a connecting rod 184. The sprocket wheel 182 is mounted on a shaft 186 which is supported for rotation within a mounting boss 188 which in turn is secured to the frame 50 by means of securement to the channel member 190 which extends from side to side of the machine. It will be appreciated that when the sprocket 182 is rotated, as by drive means which will be described below, the connecting rod 184 is moved towards the left, thereby moving the slide bars 176 within the bearing blocks 178 to move the second shear blade 30 toward and into engagement with the first shear blade 28. Upon completion of the shearing action, the sprocket wheel 182 completes its rotation through 360 degrees and the eccentric 180 then contacts a microswitch 192 (see the dotted line configuration in FIG. 5) which signals the end of the shearing operations at the third cutting station.

Associated with the movable shear blade 30 is a clamping block 194 which is normally positioned in an overlying relationship to the cutting edge of the movable shear blade 30. The clamping block 194 is secured to a pair of slide rods 196 which are loosely engaged in a transverse block 198 which is rigidly supported upon the angle bar 174. Compression springs 200 are mounted about the slide rods 196 and are positioned between the clamping block 194 and the transverse block 198 to bias the clamping block 194 away from the transverse block 198. Heads 196a are formed on the ends of each of the slide rods 196 to prevent their disengagement from the block 198. When the cuttting action of the shear blades 28, 30 is effected, the web of sheet material 10 is clamped by the clamping bar 194 against the forward edge of the first or stationary blade 28. Subsequent movement of the shear blade 30 causes compression of the springs 200 and the clamping bar 194 effectively clamps the web of sheet material 10 against the stationary shear blade 28. Upon further movement of the shear blade 30, the springs 200 are further compressed and the slide rods 196 move within the transverse block 198 such that the clamping action between the block 194 and the stationary blade is maintained; however, the movable blade 30 may progress through its shearing storke under the influence of the eccentric 180. When the shearing stroke is completed, the sprocket wheel 182 is returned to its inactive position as shown in FIG. 5 and the eccentric 180 contacts the microswitch 192 to halt further rotation of the sprocket wheel 182.

The description of the drive means for the eccentric 180, as well as the description for the drive means of the rollers 82, 90, 92 and the corner cutter 22, will be explained more fully below. In addition, the coordinating operations of the control circuit, shown schematically in FIG. 10, will be more completely described below to indicate the particular structures utilized in the present machine to provide the desired control function.

Now, referring to FIGS. 1, 3 and 5, description will be made of the mechanisms at the receiving or stacking station 34 which effectively receive the cut rectangular sheets RS after they have been severed from the web of sheet material 10 at the third cutting station 26. A rocker beam 202, generally U-shaped in configuration and having a pair of legs 204 and a cross piece 206 interconnecting the upper ends of the legs 204, is pivotally mounted on the frame 50 by means of the pivot shaft 208 and the bearings 210 at the lower ends of the legs 204 and on the lower members of the end frames 52, 54. The pivot shaft 208 is located directly below the flow path FP and below the third cutting station 26 such that, upon rocking movement of the rocking beam 202, the cross beam 206 will cut across the flow path FP and will engage the sheet material 10 at approximately the same time that it is being severed by the shear blades 28, 30. As will be described below, the rocking movement of the rocker beam 22 is timed with the action of the shear blades 28, 30 such that the cut rectangular sheet RS will be draped across the cross piece 206 as generally illustrated in FIG. 5. The rocker beam 202 is moved by means of an eccentric generally designated by the numeral 212 (see FIG. 5) which includes a disc 214 having a circular engagement pin 216 which, in turn, is received between two opposed guide rails 218, 220 secured along the length of one of the legs 204 of the rocker beam 202. The disc 214 is mounted upon a shaft 222 which, in turn, is mounted within a rectangular mounting plate 224 which is rigidly secured to the end frame 52 of the machine frame 50. The shaft 222 and the disc 214 are driven through means which will be subsequently described and are controlled by means of a pair of microswitches 226, 228 mounted on the mounting plate 224 at diametrically opposed points of the disc 214. A contact point 228 on the periphery of the disc 214 engages the actuating arm of the respective microswitches when the rocker beam 202 is moved into either one of its extreme positions. The operation of the microswitches within the control circuit will be more specifically described below. It is sufficient to note at this point, however, that the rocker beam 202 is moved by the eccentric 212 through a complete rocking motion for each rectangular sheet of material RS cut in the machine and is transported in timed relation to the cutting operations of the shear blades 28, 30 such that each rectangular sheet RS is draped over the cross piece 206 of the rocker beam 202 in the same orientation as the previously cut pieces.

The rolls, 40, 42 at the rear of the machine are formed of the excess material 36, 38 which is removed from the main body of the sheet material 10 by the action of the side cutting wheels 14. The rolls 40, 42 are formed on a pair of mandrels or hubs 230 (see FIG. 2) supported on rotating shafts 232 which are received within appropriate bearing means 234 carried by generally triangular supporting extensions 236 mounted upon the end frame 52, 54 of the frame 50 on the rearward side of the machine. The takeup shafts 232 are driven through conventional slip clutches 238, to compensate for the changing radius of the rolls 40, 42, by means of a pair of sprocket chains 240 which are driven from the main drive mechanisms of the machine as will be described below.

Reference will now be made to FIGS. 1, 3, 5, 6 and 7 for a description of the drive mechanisms of the machine. A motor 242 is secured to the frame of the machine adjacent the lower end of the end frame 252 with its axis parallel to the axis of the various rollers. A V-belt pulley 244 is secured to the motor shaft and a V-belt 246 interconnects the motor 242 with a large pulley 248 which is fixed to a shaft 250 mounted for rotation within a large yoke 252 (see FIG. 3). The yoke 252 is supported on the frame 50 at a main cross member 254 which is secured to the end frame 52 and to the cross brace 78. The yoke 252 includes a first arm 256 which contains a bearing 258 mounting the shaft 250 for rotation, and a second arm 260 parallel to and spaced from the first arm 256.

A second pulley 262 is rigidly secured to the shaft 250 and rotates with the large pulley 248 to drive a V-belt 264 which is connected in driving arrangement to the shaft 266 through the associated pulley 270. The shaft 266 is mounted for rotation and supported by the mounting plate 224 and an associated mounting plate 272 (see FIGS. 1 and 3) positioned outwardly of the plate 224 and supported on and spaced therefrom by means of the spacer rods and bolts 274. Rigidly mounted on the shaft 266, among other things, is a sprocket wheel 276 which is connected through the link chain 278 to a clutch 280 which is mounted on the shaft 88 of the anvil roller 82. An idler wheel 279 is conveniently mounted on the frame 50 to take up any slack in the link chain 278. The chain 278 is engaged by a sprocket drive on the driving portion 282 of the clutch 280, which driving portion 282 is loosely journalled for rotation on the shaft 88. The clutch 280 also includes a driven portion 284 keyed to the shaft 88 as indicated in the dotted line configuration at 286 to prevent rotation but to allow for some axial movement. A pair of commutation rings 282a are formed on the driving portion 282 for delivery of electric current to energize the magnetic elements of the clutch 280 to interconnect the driving portion 282 with the driven portion 284. It will be appreciated that, upon energization of the clutch 280, the driving member 282 will be effectively connected to the shaft 88 through the driven portion 284 and the key 286. As will be explained below, this connection is effectively made and broken in timed relationship to the rest of the operations of the cutting machine. When the clutch 280 is energized, the shaft 88 is rotated, thus rotating the anvil roller 82 to drive the sheet material 10 through the machine along the flow path FP. An electrical braking member 288 is also positioned in association with the driven member 284 on the side thereof opposite the driving clutch member 282. The brake 288 is coaxial of the shaft 88 and is rigid with the frame 50 at the mounting plate 84. When the brake 288 is energized through the appropriate electrical connections, the driven member 284 is attracted to it, thus effectively providing a positive stop to halt rotation of the anvil roller 88 and to maintain the same in a stationary position. As will be explained in detail below, the brake 288 is activated upon release of the clutch 280 and vice versa, thereby maintaining continuous and positive control over the anvil roller 82.

Rigidly attached to the shaft 88 is a further sprocket wheel 290 which effectively drives the rewind rolls 40, 42 through a link chain 292 connected to a double sprocket wheel 294 which, in turn, is connected to the link chain 246 which transmits rotary power to the spring loaded friction clutch 238 and thence to the rewind shaft 232. A similar structure is provided at the side of the machine opposite that shown in FIGS. 1 and 3 (see FIGS. 6 and 7). Accordingly, the rewind shafts 232 are driven through their respective spring clutches 238 at all times that the anvil roller 82 is rotated.

The shaft 88 also carries a still further sprocket wheel 296 which effectively serves to drive a commercial "0-Max" metering device which is generally designated herein by the numeral 298. Specifically, a chain 300 is engaged about the sprocket wheel 296 and is engaged about a complementary sprocket wheel 302 which is mounted on the input shaft of a metering unit 304. The output shaft of the unit 304 comprises a disc 306 which has an off-center pin 308 which selectively engages first one and then another of a pair of microswitches 310, 312. The microswitches 310, 312 are integrated into the control system of the machine and effectively count a length of sheet material 10 as it passes over the anvil roller 82. The output-input rotation ratio of the length metering device 298 is infinitely variable and therefore, through the switches 310, 312, is utilized to control the length of the rectangular sheets of material RS.

Referring back again to FIG. 3 and to the shaft 250 upon which is mounted the large V-belt pulley 248, it is noted that at the inner end of the shaft 250 there is rigidly mounted an electric clutch driving element 314 of a clutch 316. The driven element of the clutch 316 comprises an armature 318 which is keyed at 320 to a further shaft 322 which is mounted along the same axis as is shaft 250 for rotation within the second leg 260 of the yoke 252. The armature 318, in a manner similar to the armature 284, is mounted for relatively small axial movement along its shaft for contact between the clutch driving element 314 and a magnetic brake 324 coaxially mounted about the shaft 322 and rigidly attached to the second arm 260 of the yoke 252. Appropriate electrical connections are made to each of the elements 314, 324. Accordingly, the shaft 322 may either be driven by the clutch 316 from the shaft 250 or may be rigidly held in position by actuating the magnetic brake 324.

On the inner end of the shaft 322 is located a sprocket wheel 326 (see FIG. 5) which is interconnected with the shear blade driving mechanism through the link chain 328 and the sprocket wheel 182 which, as described above, is effective to drive the eccentric 180 and thereby to actuate the movable shear blade 30 at the cutting station 26. As will be explained in more detail below, the microswitch 192 associated with the eccentric 180 effectively controls operations of the magnetic clutch 316 and brake 324, thereby controlling the operations of the shear blades 28, 30.

The drive mechanism which operates the rocking beam 202 is best seen in FIG. 3 and includes the shaft 266 described above which is driven from the motor 242 through the respective pulleys 248, 262 and 270. At the left-hand end (as seen in FIG. 3) of the shaft 266, there is mounted a pinion gear 326 which is in engagement with a larger complementary gear 328 rigidly secured to a magnetic clutch driving element 330 which forms a driving portion of a magnetic clutch 332, thereby to rotate the element 330 at a reduced speed in comparison to the speed of the shaft 266. The other portion of the magnetic clutch 332 comprises an armature 334 which is keyed to a shaft 336 mounted for rotation within the mounting plates 224 and 272 parallel to and spaced from the rotating shaft 226. The driving clutch element 330 and its associated pinion gear 328 are freely journalled about the shaft 336 for rotation thereon. A second pinion gear 338 is also rigidly mounted on the shaft 266 and similarly engages a mating pinion gear 340 of approximately the same size which is rigidly formed on the driving portion 341 of a further magnetic clutch 344. The magnetic clutch 344 includes as its driven element the previously mentioned armature 334 which is keyed at 345 to the shaft 336 for sliding movement between the face plate of the magnetic clutch element 330 of the clutch 332 and the magnetic clutch element 342 of the magnetic clutch 344. It will be appreciated that the magnetic clutch 332 will drive the armature 334 at one rate of rotation through the gears 326, 328 and the magnetic clutch 344 will drive the armature 334 at a faster rate through the gears 338, 340. Accordingly, upon selective energization of the magnetic clutches 332, 334, the shaft 336 will be driven at either one of two rates of rotation. The shaft 336 extends inwardly through the mounting plate 224 and is rigidly secured to the disc 214 of the eccentric 212. A magnetic brake 346 is mounted coaxially about the shaft 336 and is rigidly connected to the mounting plate 224 for cooperation with the armature 348 which is keyed, at 350, to the shaft 336. The brake 346 is effective to assure that the shaft 336, and therefore the eccentric 212 and the rocking beam 202, will remain stationary at the desired periods during the operation of the machine. Appropriate electrical connections are made to the elements 330, 342, 346 for control of the respective clutches 332, 344 and the brake 346 such that the eccentric 212 may be selectively driven at relatively low speed, at a higher speed or rigidly maintained in a fixed position under the control of a simple series of electrical switches.

Figure 7:
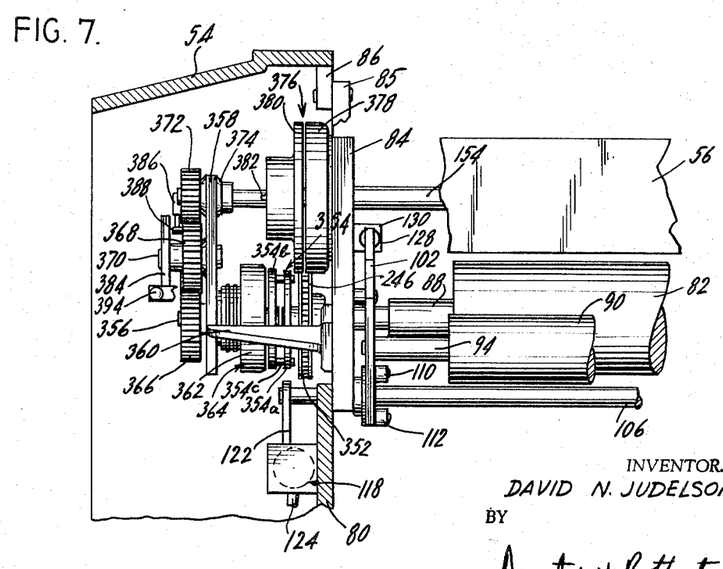
FIG. 7 is a sectional view taken along the line 7—7 of FIG. 6 and looking in the direction of the arrows.

Reference will now be made to FIGS. 6 and 7 for a description of the drive mechanisms which are effective to operate the corner radius cutters 22 at the appropriate moment of time in the operating cycle of the cutting machine. The shaft 88 of the anvil roller 82 extends through the rectangular mounting plate 84 on the left-hand end of the machine as seen in FIG. 7 and a sprocket 352 is mounted on the shaft 88 on the outward side of the mounting plate 84. The link chain 246, which is connected to the left-hand slip clutch 238 and take-up roll 42, is engaged about the sprocket 352, thus transmitting rotational power from the anvil roller 82 to the take-up roll 42. The shaft 88 further extends to a mechanical dog clutch 354, which is rigidly secured to the shaft 88 at its first element 354a. A second element 354b is positively connected to the first portion 354a by pins 354c which allow for some longitudinal movement between the two elements. The element 354b extends beyond the end of the shaft 88 and is coaxial about a shaft 356 which, in turn, is coaxial with the shaft 88 and is mounted for rotation in an auxiliary mounting plate 358. The auxiliary mounting plate 358 is secured to the frame 50 at the rectangular mounting plate 84 by a pair of support brackets 360, best seen in FIGS. 6 and 7. The driving element 362 of an electro-magnetic clutch 364 is rigidly mounted on a shaft 356 and, upon energization, becomes coupled with the second member 354b of the dog clutch 354, thereby to transmit rotation from the shaft 88 through the dog clutch 354 and through the electro-magnetic clutch 364 to the shaft 356. Appropriate electrical connections are provided to the driving electrical element 362. A pinion gear 366 is connected to the shaft 356 externally of the auxiliary mounting plate 358 and is engaged with a reversing gear 368 which is also mounted upon the auxiliary plate 358 by means of the bearing shaft 370. The reversing gear 368 is interconnected with a further gear 372 which is rigidly connected to the keyed shaft 154 of the corner radius cutting mechanisms, which shaft 154 is mounted for rotation within the auxiliary mounting plate 358 by the bearings 374. A braking mechanism, generally designated by the numeral 376, is provided to maintain the keyed shaft 154 stationary when desired and comprises a magnetic element 378 which is rigidly secured to the mounting plate 84 and an armature 380 which is keyed to the shaft 154 at 382. When the magnetic element 378 is energized by the appropriate switching element which will be described below, the armature 380 is firmly interconnected therewith, thus making the keyed shaft 154 rigid with the frame 50 of the machine.

A corner radius cutter control plate 384 is journalled on the bearing shaft 370 at its outer extremity for pivotal motion about that shaft both with respect to the shaft and to the other elements of the corner radius cutter drive assembly shown in FIGS. 6 and 7. A first corner cutter microswitch 386 is mounted upon the auxiliary plate 358 and is operatively engaged with a pin 388 carried by the reversing gear 368 such that upon rotation of the gear 368 the microswitch 386 is activated once during each revolution of the gear 368. A second microswitch 390 is mounted in association with the gear 368 and specifically is mounted on the adjustable control plate 384 such that the contact arm of the microswitch 390 is engaged by the pin 388 on the second gear 368 as that gear rotates. The angular travel of the pin 388 between the time it leaves the microswitch 386 and contacts the microswitch 390 may be adjusted by rotating the control plate 384 about the shaft 370. An adjustment mechanism 392 is provided for this purpose and includes an adjustment screw 394 which is mounted for rotational movement in a block 396 fixed to the auxiliary plate 358 and is threadedly engaged in an adjustment block 398 secured to a corner of the adjustable control plate 384. As the screw 394 is rotated within the mounting block 396, the threads of the screw effectively move the adjustment block 398 along the length of the screw 394, thereby rotating the control plate 384 about its pivotal mount on the shaft 370. This rotational movement will, of course, vary the angular relationship between the two microswitches 386, 390, thereby varying the interval between successive activation of those microswitches by the moving pin 388. This control feature is utilized in the cutting machine to control the operations of the end cutting shear blades 28, 30 with respect to the operations of the corner radius cutters 22.

A description will now be made of the control elements illustrated in the schematic diagram of FIG. 10 which are utilized to govern the operations of various elements of the machine as described. A pair of alternating current power lines 400, 402 are provided from a power source and are generally controlled by an overall switch (not shown). The lines 400, 402 are connected across a full wave rectifier 404 which provides direct current through its output lines 406, 408 between which lines are connected the various electromagnetic clutch and braking devices.

Among the manual switching devices on the cutter machine there is included a manual push button switch 410 which is in series with a solenoid valve V1 in the main air line 412 to control the delivery of air to the air hose 142 connected to the piston and cylinder 118. Accordingly, upon energization of the normally closed valve V1, the piston and cylinder assembly 118 will operate to lift the guide rollers 90, 92 out of engagement with the anvil rollers 82, thereby to allow a length of sheet material 10 to be fed along the feed path FP. A second solenoid valve V2 is similarly connected across the A.C. power lines 400, 402 and is in series with a knife switch 414 to selectively energize the valve V2. The valve V2 is connected in the air supply line 412 to govern control of air to the hose line 150 which delivers air to the piston and cylinder assembly 142. Upon closing of the knife switch 414, air is delivered to the piston and cylinder 142, thereby to move the edge cutting knives 14 out of their normally biased engagement with the anvil roller 82. Accordingly, the switches 410 and 414, through the valves V1 and V2 respectively, enable the machine operator to initially feed sheet material 10 into the flow path FP of the cutting machine.

Figure 10:
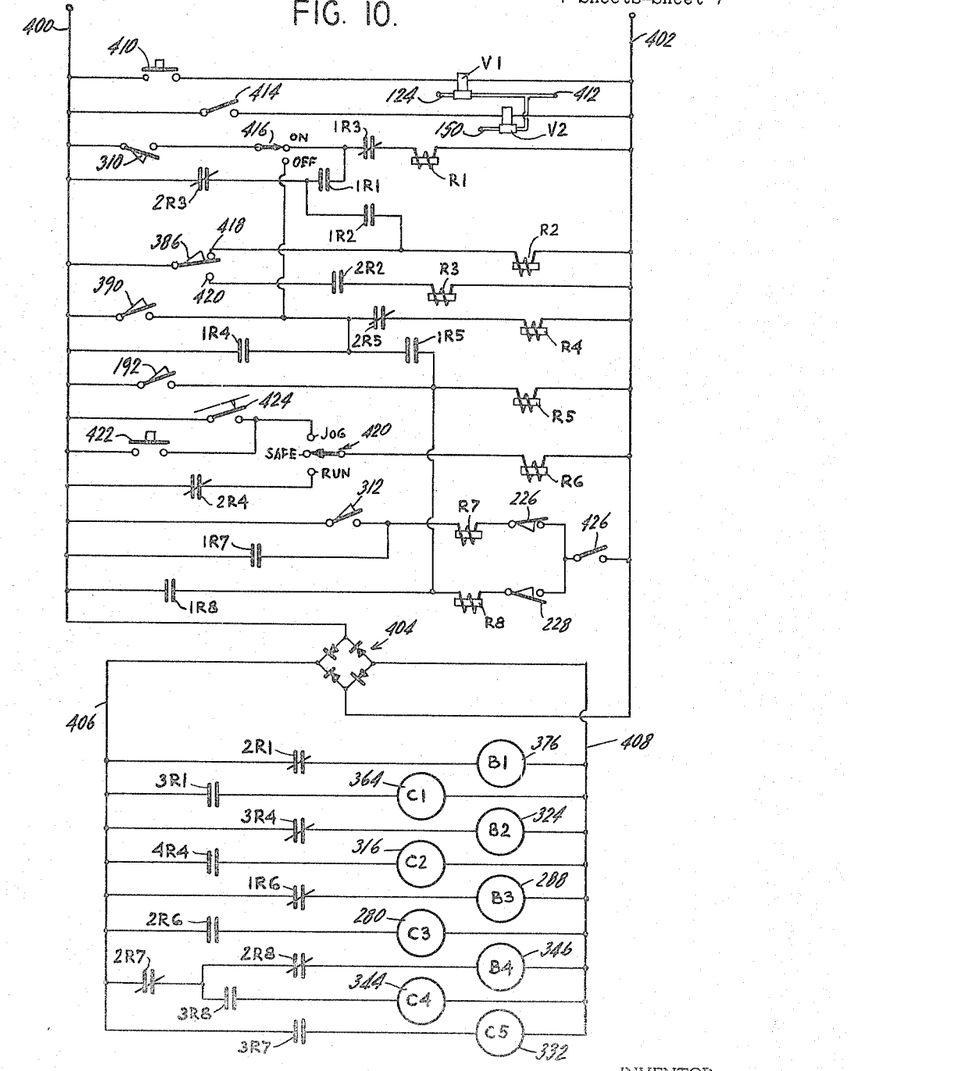
FIG. 10 is a schematic drawing of the electrical control circuit of the machine.

During the operations of the machine, the Zero-Max measuring device (see FIG. 4) indicates the proper point for the operation of the corner radius cutter 22 by the activation of the switch 310 which may be seen on the third circuit line from the top in FIG. 10. The control switch 310 is connected through a manually controlled on-off switch 416 through a normally closed, solenoid operated contact 1R3 to a first solenoid relay R1. Upon energization of the relay R1, a holding circuit, including the first relay contact 1R1 and the normally closed relay switch 2R3, effectively maintains the first solenoid relay R1 in energized condition independent of the control switch 310. Energization of the first relay R1 effectively releases the brake 376 (also labeled B1 in FIG. 10) and energizes the clutch 364 (C1), thereby to deliver actuating power to the corner radius cutters 22. Specifically, the second contact of the first relay R1 is a normally closed contact 2R1 which is in series with the brake 376 (B1) (see FIG. 7) across the direct current power lines 406, 408, thereby to release the keyed shaft 154 for rotation. Simultaneously, the third contact 3R1 is closed to energize the magnetic clutch 364 (C1) (see FIG. 7) which clutch, as explained above, is effective to transmit rotational power from the anvil roller shaft 88 through the gears 366, 368, 372 to the key shaft 154 and thence to the corner radius cutter 22. Accordingly, upon closing of the switch 310, the corner radius cutters 22 are actuated.

At the instant when the switch 310 is closed by operation of the Zero-Max unit 298, the single-pole double-throw microswitch 386 (see FIG. 6) is engaged with its first contact 418 which is connected in series to the second solenoid relay R2 across the A.C. power lines 400, 402. The first contact 1R2 of the second solenoid relay R2 is connected between the contact 418 and the holding circuit for the solenoid relay R1 to energize the relay R1 independent of the condition of the relay R3 (see below) so long as the microswitch 386 is engaged with its first contact 418. Upon movement of the various mechanical elements in the drive mechanism for the corner radius cutter 22, the radius indexing switch 386 is moved to its second contact 420 which is in series with the second contact 2R2 of the relay R2 which, in turn, is in series with the third solenoid relay R3. Accordingly, as soon as switch 386 is moved to its second contact 420, R3 becomes energized and its normally closed first contact 1R3 is opened to deenergize relay R1 and thereby to stop operations of the corner radius cutters 22. Similarly, the second and normally closed contact 2R3 of the solenoid relay R3 will be moved to its opened position, thereby breaking the holding circuit to the relay R2 and deenergizing that relay which will return its second contact 2R2 to its normally opened position which will deenergize the third solenoid relay R3. Thus, it is seen that microswitch 310 effectively institutes the activities of the corner radius cutters 22 and that the control switch 386 on the auxiliary mounting plate 358 terminates operations of the corner radius cutters 22.

The second control switch seen in FIG. 6, microswitch 390, is connected in series with the fourth solenoid relay device R4 through a normally closed relay contact 2R5. Accordingly, when the gear 368 of the corner radius cutter drive means rotates a sufficient amount for the pin 388 to contact the switch 390, that switch is moved from its normally opened to its closed position, thereby to energize the fourth solenoid relay R4. The first contact 1R4 of the relay R4 is connected in a holding circuit for the relay R4 through the normally closed contact 2R5 and the second contact 2R4 is connected to the drive control mechanisms as will be explained in more detail below. The third and fourth contacts 3R4 and 4R4 effectively control the shear blades 28, 30 at the third cutting station 26. Specifically, the third contact 3R4 is a normally closed contact which is connected in series across the D.C. lines to the brake 324 (labelled B2 in FIG. 10) and the normally opened contact 4R4 is connected in series across the D.C. lines to the electromagnetic clutch 316. Accordingly, upon the closing of the shear control switch 390 and energization of the solenoid relay R4, the brake 324 (B2) is released and the clutch 316 (C2) is energized, thus delivering the driving power to the eccentric 180 and through the slide bars 176 to move the shear blade 30 into its operative engagement with the shear blade 28, thereby to sever the sheet material 10 at the third cutting station 26. The termination of the shearing operation is controlled by the microswitch 192 (see FIG. 5) which is closed upon the completion of a 360 degree rotation of the eccentric 180. The microswitch 192 is connected in series with the fifth solenoid relay R5 across the A.C. power lines 400, 402. The second normally closed contact 2R5 of the relay R5 is opened upon energization of the relay R5, thereby deenergizing the relay R4 to energize the shear brake 324 (B2) to deenergize the clutch 216 (C2) through the contacts 3R4 and 4R4 respectively. The first contact 1R5 of the relay R5 is connected to a holding circuit for the relay R5 which also includes the contact 1R4 of relay R4.

Reference will now be made to the circuitry which controls the main drive mechanisms of the cutting machine. The second and normally closed contact 2R4 of the shear control solenoid relay R4 is connected through one contact of a single-pole triple-throw manual selector switch 420 to a main drive control solenoid relay R6. Since the contact 2R4 is normally closed, whenever the shear control relay R4 is energized, the drive control relay R6 is deenergized, thereby preventing movement of the sheet material 10 during the shearing operations. For purposes of setting up the machine and making adjustments, the switch 420 may be manually set either to the "run" position in series with the contact 2R4, to the "safe" position wherein the relay R6 may not be energized at all or to the "jog" position wherein relay R6 may be energized either through a manual push button 422 or a foot-operated switch 424. The purpose of these devices is to provide means for manually controlled rotation of the anvil roller 18 while the machine operator feeds a new roll of sheet material along the flow path FP. It will be appreciated that when the switch 420 is set in the normal "run" position, the relay R6 will be continuously energized except for those periods of time when the shearing operations are being effected at the third cutting station. The first normally closed contact of the relay R6 is connected in series across the D.C. power lines to the brake 288 (B3) and the second normally opened contact 2R6 is connected in series across the D.C. power lines to the drive clutch 280 (C3). Energization of the relay R6 effectively releases the main brake 288 (B3) and engages the main drive clutch 280 (C3), thereby to deliver rotational power from the motor 242 through the various drive belts, pulleys, chains and sprockets to the anvil shaft 88 and the anvil roller 82.

Reference will now be made to the remaining portion of the schematic diagram of FIG. 10 which shows the control circuit for the rocker beam 202 at the material stacking station 34. The second control switch on the length measuring mechanism 298 (see FIG. 4) is a microswitch 312 which is connected in series between the A.C. power lines 400, 402 with the first swing control solenoid relay R7, the normally closed cam controlled switch 226 which is operatively engaged with the rocker beam eccentric 212, and a manual on-off switch 426. A holding circuit is provided by the first contact 1R7 of the relay R7 to keep the relay R7 in an energized condition, even if the microswitch 312 is opened. The opening of the second and normally closed contact 2R7 of the relay R7, upon the closing of the switch 312, effectively deenergizes the rocker arm brake 346 (B4) and the high speed clutch 344 (C4). Simultaneously, the third contact 3R7 is closed which, as may be seen in the bottom of FIG. 10, effectively energizes the low speed rocker arm clutch 332 (C5) to swing the rocker arm 202 at a relatively low speed from the position shown in FIG. 5 to the right (in FIG. 9) to receive a rectangular sheet RS of the material as it is cut from the sheet material 10 in the third cutting station 26. Power is transmitted for this operation through the gears 326, 328 to the eccentric device 212 and the engagement pin 216 and guide rails 218. Upon completion of 180 degrees of revolution of the eccentric 212, the contact 227 engages the second normally closed swing beam microswitch 226 to effectively break the circuit through that switch, thereby deenergizing relay R7, deenergizing the clutch 332 (C5) and closing contact 3R7 such that the high speed clutch 344 (C4) may be energized. The quick return control solenoid relay R8 is energized through contact 1R5 at the end of the shearing operations by the energization of relay R5 through microswitch 192. Relay R8 is held in its energized state by means of the holding circuit through the first contact 1R8 as shown in FIG. 10. The control relay R8 has a second and normally closed contact 2R8 in series with the rocker beam brake 346 (B4) which contact is opened upon energization of the relay. The third contact 3R8 is in series with the high speed clutch 344 (C4) such that as soon as the shearing operations at the third cutting station 26 are completed, the rocker beam 202 is swung, in its high speed mode, from its right hand position as seen in FIGS. 5 and 8 to its left hand position. When this high speed return is completed, the eccentric 212 once again contacts the normally closed microswitch 228, thereby to deenergize the relay R8, thus energizing the brake 346 to hold the rocker beam 202 rigid. At any time during the operation of the cutting machine, all movement of the rocker beam 202 may be halted simply by opening the manual control switch 426. Similarly, the manually controlled switch 416 may be moved to the "off" position to deactivate the corner radius cutters 22 and to automatically complete the shearing operations and the fast return movement of the beam 202.

The operations and mechanisms of the sheet cutting machine in accordance with the present invention may be best understood by considering the following description of the operations of the machine. Following this description, reference will be made to the schematic diagram of FIG. 9 which illustrates the geometric relationship between the operations of the corner radius cutters 22 and the shear blades 28, 30 with respect to the movement of the sheet material 10 along the length of the flow path FP.

Figure 1:
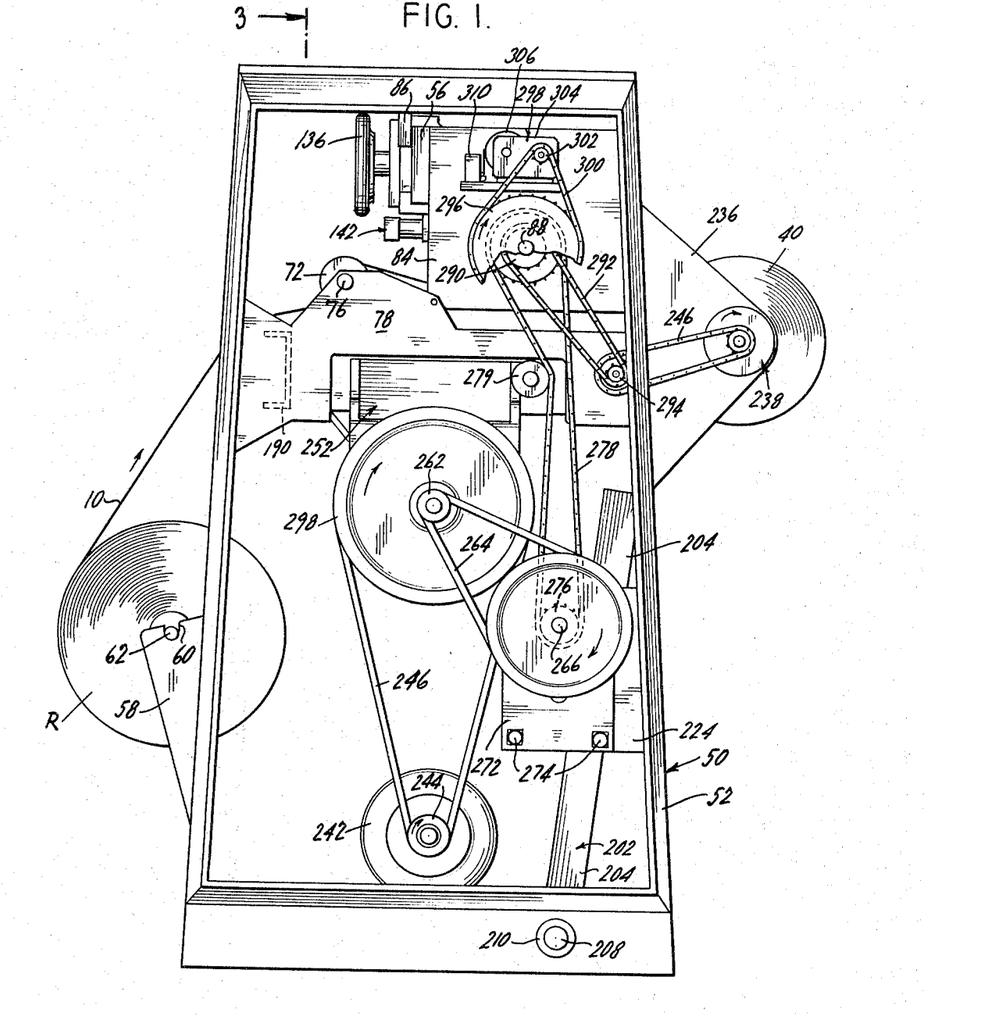
FIG. 1 is a side elevational view of a sheet material cutting machine according to the present invention with portions broken away for the sake of clarity.
Figure 2:
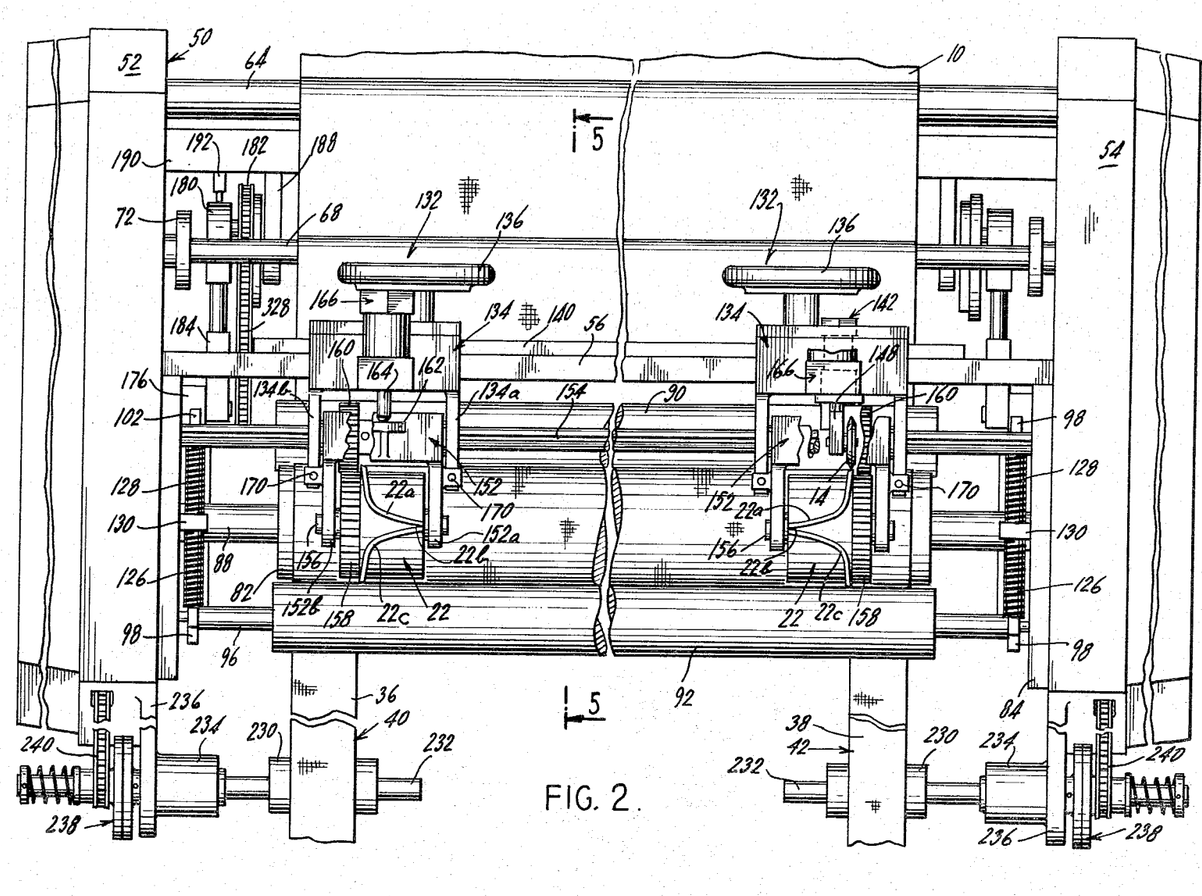
FIG. 2 is a top view of the machine with portions broken away for the sake of clarity and with intermediate portions cut out to reduce the overall size of the drawing.

With a roll of sheet material 10 positioned within the machine and with the anvil roller 82 being driven from the drive means illustrated in FIGS. 1 and 3, the sheet material 10 is moved along the flow path FP and about the surface of the anvil roller 82 while the side cutting knives 14 are forming the side edge cuts 18. As the sheet material 10 is fed along the feed path FP, the length metering device 298 measures the amount of material as it flows through the machine and, upon the closing of the corner radius cutter control switch 310 by engagement of that switch with the actuating pin 308, rotation of the corner radius cutters 22 at the second cutting station 20 is effected. Specifically, the brake 376 is released and the clutch 364 is energized, thereby initiating rotation of the keyed shaft 154, the gears 160 and 158 and the corner cutters 22. The rotation of the corner radius cutters 22 brings the knives 22a, 22c into engagement with the sheet material 10 on the anvil roller 82, with the material 10 and the knives 22a, 22c traveling at the same linear speed. Continued rotation of the anvil roller 82 moves the sheet material 10 along the flow path FP to bring the end line 32 into the third cutting station 26. Arrival at that location is indicated in the cutting machine by the closing of the shear control switch 390 mounted on the adjustment mounting plate 384 of the corner radius cutter drive means. The switch 390 is adjustable with respect to the angular position of the gear 368 such that the time at which the switch 390 is closed may be accurately adjusted to correspond with the time at which the line 32 on the sheet material 10 arrives at the third cutting station 26. Upon the closing of the shear control switch 390, the drive to the anvil roller 82 is halted and the brake 288 is engaged to maintain the sheet material 10 in a fixed position. Simultaneously, the shear brake 324 is released and the shear clutch 316 is engaged to activate the movement of the shear blade 30 and to cut a rectangular sheet RS from the remainder of the sheet material 10. At the time the end cut by the shear blades 28, 30 is being effected, the rocker beam 202 is being moved through its slow pick-up stroke under the influence of the slow speed clutch 332 such that the newly cut rectangular sheet RS is accurately draped across the cross bar 206 of the rocker beam 202. Upon the completion of the shearing operations at the third cutting station 26, the drive to the anvil roller 88 is reestablished and a new cycle of material feeding, edge cutting, corner cutting and end cutting is initiated.

Figure 9:
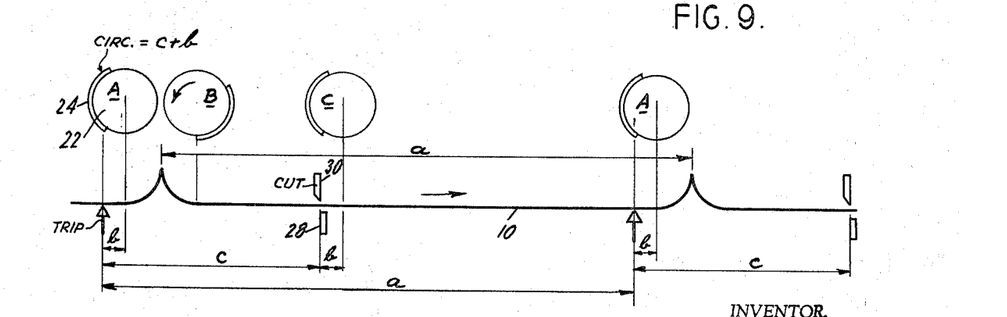
FIG. 9 is a schematic and graphical illustration of the cyclical operation of the machine according to the present invention, showing the various geometrical relationships between the cutting means and the movement of the sheet material.

Reference will now be made to FIG. 9 for a brief explanation of the timing sequence between operations of the corner cutting wheels 22 and the shear blades 28, 30. FIG. 9 should be viewed as a schematic representation of the operations of the machine 10 with the horizontal distance being equated either to time or to movement of the sheet material 10 along the material flow path FP, it being understood that with appropriate conversion factors those two quantities are identical. Furthermore, it should be appreciated that the locations of the representations of the corner cutters 22 in FIG. 9 do not indicate four separate physical locations for those corner cutters, but rather indicate the rotational or angular position of the corner cutters 22 with time or, to put it differently, the angular orientation of the corner cutters 22 with respect to the sheet material 10 passing beneath them. At the left hand end of FIG. 9, there is shown an arrow, labelled "TRIP," which indicates the point in time at which the rotation of the corner radius cutter 22 is initiated. After an initial lag period, labelled b, the cutting blades 22a, 22c become engaged with the sheet material 10 and form the butterfly shaped double radius cut as illustrated in FIG. 9. During the time that this cut is being accomplished, it will be appreciated that the corner radius cutter 22 has rotated with a peripheral velocity which is identical to the linear velocity of the sheet material 10 (identical to the peripheral velocity of the anvil roller 82). The change in angular position of the corner radius cutter 22 may be appreciated by comparing the representation labelled A with the representation labelled B in FIG. 9. The corner radius cutter 22 continues to complete its 360 degree rotation until it arrives at the angular position indicated by the representation labelled C, at which time the control circuit halts rotation of the shaft 154 of the corner cutters 22. Of course, during this period of time, the sheet material 10 has continued to move along the material flow path FP and, accordingly, the linear or time location of the representation of the corner cutter 22 has been moved toward the right in FIG. 9. After the initial "TRIP" signal from the microswitch 310, and after the corner radius cutter drive mechanisms have rotated through an amount equal to the distance or time c in FIG. 9, the microswitch 390 is closed by engagement with the pin 388 on the gear 368 halting further movement of the sheet material 10 along the flow path FP and activating the shearing operations of the shear blades 28, 30. Of course, during the period of time c, the sheet material 10 has also been moving for a length of time c across a distance c such that the location of the center point of the butterfly shaped radius cut is located exactly along the cut lines to be formed by the shear blades 28, 30. At the completion of the shearing operations, the sheet material 10 continues to move for a distance (or time) sufficient to complete a length a equal to the length of the desired rectangular sheet RS. The "TRIP" signal is once again actuated to repeat the cutting operations of the machine.

It will be appreciated that the illustrative machine built in accordance with the present invention provides an automatic and extremely flexible mechanism for the cutting of a continuous web of sheet material into a plurality of generally rectangular sheets having rounded corners. The flexibility of the machine according to the present invention is obvious in that the width or length of the individual rectangular sheets may be easily and simply varied by making the most simple adjustments to the machine. It will be further appreciated that the described mechanisms will continuously cut such generally rectangular sheets of material with virtually no requirement for attendance other than to reload the machine with additional rolls of the basic material and to remove the cut rectangular sheet from the material receiving station of the machine. Due to the high speed operation of this machine in combination with the elimination of the requirement for hand labor, a significant cost reduction has been effected.

Although the foregoing description and the drawings annexed hereto illustrate only one presently preferred embodiment of the invention, it will be appreciated that numerous design elections differing from those specifically shown and described herein may be incorporated within a machine which nevertheless embodies the teachings of the present invention. Accordingly, the claims appended hereto should be construed broadly in a manner consistent with the spirit and scope of the invention.

What I claim is:

1. A machine for cutting rectangular sheets having rounded corners from a continuous web of sheet material, comprising a frame, guide means defining a sheet material flow path, sheet material advancement means, a pair of side cutting knives at a first cutting station for cutting sheet material into a predetermined width, a pair of corner cutters at a second cutting station mounted for movement into and out of said flow path, means mounting said side cutting knives and said corner cutters for movement transverse to said flow path for adjusting the relative positions thereof to cut said web of material and to form corner cuts therein at selectively predetermined widths, end cutting means at a third cutting station for transversely cutting said sheet material to sever said rectangular sheets therefrom, rectangular sheet-receiving means adjacent said third cutting station, drive means operatively connected to said sheet material advancement means, said side cutting knives, said corner cutters and said end cutting means and coordination and control means for periodically advancing said sheet material, moving said corner cutters into said flow path, halting the advancement of said sheet material and activating said end cutting means for cutting rectangular sheets from said web of material having rounded corners and being of a predetermined width.

2. A machine for cutting rectangular sheets having rounded corners from a continuous web of sheet material, comprising a frame, means defining a sheet material flow path including an anvil roller mounted for rotation in said frame and a guide roller for guiding the web of material about said anvil roller, rotation of said anvil roller advancing said web of material along said flow path, a pair of side cutting knives at a first cutting station along the periphery of said anvil roller adjustably movable with respect to each other for cutting sheet material into a predetermined width, a pair of corner cutters at a second cutting station along the periphery of said anvil roller mounted for movement into and out of said flow path and movable with said side cutting knives for cutting rounded corners at said predetermined width, end cutting means at a third cutting station removed from said anvil roller for transversely cutting said sheet material for cutting said rectangular sheets therefrom, sheet-receiving and stacking means comprising a movable receiving arm, means moving said arm in timed relation below said end cutting means and transverse to said flow path for catching a rectangular sheet as it is cut from said web of sheet material, drive means operatively connected to said anvil roller, said corner cutters and said end cutting means, and coordination and control means for periodically advancing said sheet material, moving said corner cutters into said flow path, halting the advancement of said sheet material and activating said end cutting means.

3. A machine for cutting rectangular sheets having rounded corners from a continuous web of sheet material, comprising a frame, means defining a sheet material flow path including an anvil roller mounted for rotation in said frame and a guide roller for guiding the web of material about said anvil roller, rotation of said anvil roller advancing said web of material along said flow path, a pair of side cutting knives at a first cutting station along the periphery of said anvil roller adjustably movable with respect to each other for cutting sheet material into a predetermined width, a pair of corner cutters at a second cutting station along the periphery of said anvil roller mounted for movement into and out of said flow path and movable with said side cutting knives for cutting rounded corners at said predetermined width, end cutting means at a third cutting station removed from said anvil roller for transversely cutting said sheet material for cutting said rectangular sheets therefrom, sheet-receiving means below said end cutting means for catching a rectangular sheet as it is cut from said web of sheet material, drive means operatively connected to said anvil roller, said corner cutters and said end cutting means, and coordination and control means for periodically advancing said sheet material, moving said corner cutters into said flow path, halting the advancement of said sheet material and activating said end cutting means.

4. A machine for cutting rectangular sheets having rounded corners from a continuous web of sheet material, comprising a frame, guide means defining a sheet material flow path, sheet material advancement means, a pair of side cutting knives at a first cutting station adjustably movable with respect to each other for cutting sheet material into a predetermined width, a pair of corner cutters at a second cutting station mounted for movement into and out of said flow path and movable with said side cutting knives for cutting rounded corners at said predetermined width, end cutting means at a third cutting station for transversely cutting said sheet material for cutting said rectangular sheets therefrom, said end cutting means including a pair of cooperating shear blades mounted transversely of said flow path with said sheet material normally passing between the respective blades, sheet-receiving and stacking means comprising a movable receiving arm, means moving said arm in timed relation below said end cutting means and transverse to said flow path for catching a rectangular sheet as it is cut from said web of sheet material, drive means operatively connected to said sheet material advancement means, said side cutting knives, said corner cutters, said end cutting means and said receiving and stacking means, and coordination and control means for periodically advancing said sheet material, moving said corner cutters into said flow path, halting the advancement of said sheet material, activating said end cutting means and moving said receiving arm beneath said end cutting means to receive the cut rectangular sheet.

5. A machine for cutting rectangular sheets having rounded corners from a continuous roll of sheet material, comprising a frame, mounting means supporting a roll of said sheet material, guide means defining a sheet material flow path, sheet material advancement means, a pair of side cutting knives at a first cutting station adjustably movable with respect to each other for cutting sheet material into a predetermined width, a pair of corner cutters at a second cutting station mounted for movement into and out of said flow path and movable with said side cutting knives for cutting rounded corners at said predetermined width, end cutting means at a third cutting station for transversely cutting said sheet material for cutting said rectangular sheets therefrom, said end cutting means including a pair of cooperating shear blades mounted transversely of said flow path with said sheet material normally passing between the respective blades, sheet-receiving and stacking means comprising a movable receiving arm, means moving said arm in timed relation below said end cutting means and transverse to said flow path for catching a rectangular sheet as it is cut from said sheet material, drive means operatively connected to said sheet material advancement means, said side cutting knives, said corner cutters, said end cutting means and said receiving and stacking means, and coordination and control means for periodically advancing said sheet material, moving said corner cutters into said flow path, halting the advancement of said sheet material, activating said end cutting means and moving said receiving arm beneath said end cutting means to receive the cut rectangular sheet.

6. In a sheet material cutting machine for cutting a continuous web of sheet material into a plurality of generally rectangular sheets having rounded corners, an anvil roller over which said web is passed, means mounting said roller for rotation about its own axis, drive means for rotating said anvil roller, a corner radius cutter comprising a body mounted for rotation about its own axis, a corner radius cutter blade mounted on edge on said body, said blade having a first curved cutting section curving in a first direction and a second curved cutting section curving in a second direction, said curved sections intersecting at an acute angle, the radial distance between the edge of said blade and the axis of said body being the same at all points along said edge, said corner radius cutter mounted adjacent said anvil roller with said blade in cooperative engagement with the peripheral surface of said anvil roller to cut said sheet material, and drive means for rotating said corner radius cutter in coordination with said anvil roller drive means for moving the edge of said blade at the same peripheral velocity as the peripheral velocity of said anvil roller.

7. A machine for cutting rectangular sheets having rounded corners from a continuous web of sheet material, comprising a frame, means defining a sheet material flow path including an anvil roller mounted for rotation in said frame and a guide roller for guiding the web of material about said anvil roller, rotation of said anvil roller advancing said web of material along said flow path, a pair of corner cutters at a cutting station along the periphery of said anvil roller mounted for movement into and out of said flow path and movable with respect to each other for cutting rounded corners at a variety of widths, end cutting means at a further cutting station removed from said anvil roller for transversely cutting said sheet material for cutting said rectangular sheets therefrom, sheet-receiving and stacking means, drive means operatively connected to said anvil roller, said corner cutters and said end cutting means, and coordination and control means for periodically advancing said sheet material, moving said corner cutters into said flow path, halting the advancement of said sheet material and activating said end cutting means.

8. A machine in accordance with claim 1 wherein said coordination and control means includes measuring means for determining the flow of material through said flow path, for deenergizing said sheet material advancement means after a predetermined amount of the web of material has moved in said flow path after the operations of said corner cutters, and for activating the drive means for said end cutting means.

9. In a continuous machine for severing individual lengths of material from a web of material including means defining a material flow path, shear means and means for advancing a length of material along said flow path and severing same at the location of said shear means, a material receiving and stacking mechanism comprising a beam movably mounted for a transverse movement across said material flow path perpendicular to the line of movement of material in said flow path and to the surface of the material in said flow path, drive means for said rocker beam including a high speed mode driving mechanism and a low speed mode driving mechanism for driving said rocker beam through a low speed pick-up movement from one side of said flow path to the other for receiving and stacking a length of material from said web and a high speed return movement for repositioning said rocker beam to begin a new pick-up movement.

10. In a continuous machine for severing individual lengths of material from a web of material including means defining a material flow path, drive means, shear means and control means for advancing a length of material along said flow path and severing same at the location of said shear means, a material receiving and stacking mechanism comprising a rocker beam movably mounted for a transverse movement across said material flow path perpendicular to the line of movement of material in said flow path and parallel to the surface of material in said flow path, drive means for said rocker beam including a high speed mode driving mechanism and a low speed mode driving mechanism for driving said rocker beam through a low speed pick-up movement from a first side of said flow path to the other for receiving and stacking a length of material from said web and a high speed return movement for returning said rocker beam to said first side, and receiving and stacking control means, moving said rocker beam through said pick-up movement in response to shearing operations of said shear means.

11. In a continuous machine for severing individual lengths of material from a web of material including means defining a material flow path, drive means, shear means and control means for advancing a length of material along said flow path and severing same at the location of said shear means, a material receiving and stacking mechanism comprising a rocker beam movably mounted for a transverse movement across said material flow path and having a cross piece perpendicular to the line of movement of material in said flow path and parallel to the surface of material in said flow path, drive means for said rocker beam including a high speed mode driving mechanism and a low speed mode driving mechanism for driving said rocker beam through a low speed pick-up movement from a first side of said flow path to the other for receiving and stacking a length of material from said web and a high speed return movement for returning said rocker beam to said first side to begin a new pickup movement, and receiving and stacking control means, integrated with said aforementioned control means, for starting said pick-up movement in response to shearing operations of said shear means and for halting said return movement of said rocker beam to position same for a further cycle of operation.

References Cited by the Examiner
UNITED STATES PATENTS

| | | | |
|---|---|---|---|
| 3,066,563 | 12/1962 | George et al. | 83—83 X |
| 3,203,291 | 8/1965 | Elsas | 83—406 X |

ANDREW R. JUHASZ, *Primary Examiner.*